United States Patent [19]

Pollack et al.

[11] Patent Number: 4,605,604

[45] Date of Patent: Aug. 12, 1986

[54] NICKEL-ALUMINUM DRY CHARGE RESERVE BATTERY

[75] Inventors: William Pollack, Scott Township, Allegheny County; Edward S. Buzzelli, Export, both of Pa.

[73] Assignee: Westinghouse Electric Corp., Pittsburgh, Pa.

[21] Appl. No.: 745,979

[22] Filed: Jun. 18, 1985

[51] Int. Cl.⁴ .............................................. H01M 6/36
[52] U.S. Cl. .................................. 429/116; 429/118; 429/210; 429/223
[58] Field of Search ............... 429/116, 118, 223, 218, 429/210, 94

[56] References Cited

U.S. PATENT DOCUMENTS

| | | | |
|---|---|---|---|
| Re. 25,913 | 11/1965 | Solomon et al. | 136/90 |
| 2,847,494 | 8/1958 | Jeannin | 136/90 |
| 3,332,804 | 7/1967 | Zaromb | 136/90 |
| 4,005,246 | 1/1977 | Schiffer | 429/94 |
| 4,146,679 | 3/1979 | Anthony et al. | 429/218 X |
| 4,288,500 | 9/1981 | Jovanovic et al. | 429/218 X |
| 4,330,603 | 5/1982 | Jackovitz et al. | 429/206 |
| 4,337,124 | 6/1982 | Maskalick | 204/2.1 |

Primary Examiner—Charles F. LeFevour
Attorney, Agent, or Firm—Daniel P. Cillo

[57] ABSTRACT

A nickel-aluminum dry charge reserve battery has at least one electrode containing a nickel hydroxide containing active battery material, and at least one aluminum electrode, with a storage reservoir containing electrolyte nearby, and a means to transfer the stored electrolyte to the electrodes.

8 Claims, 1 Drawing Figure

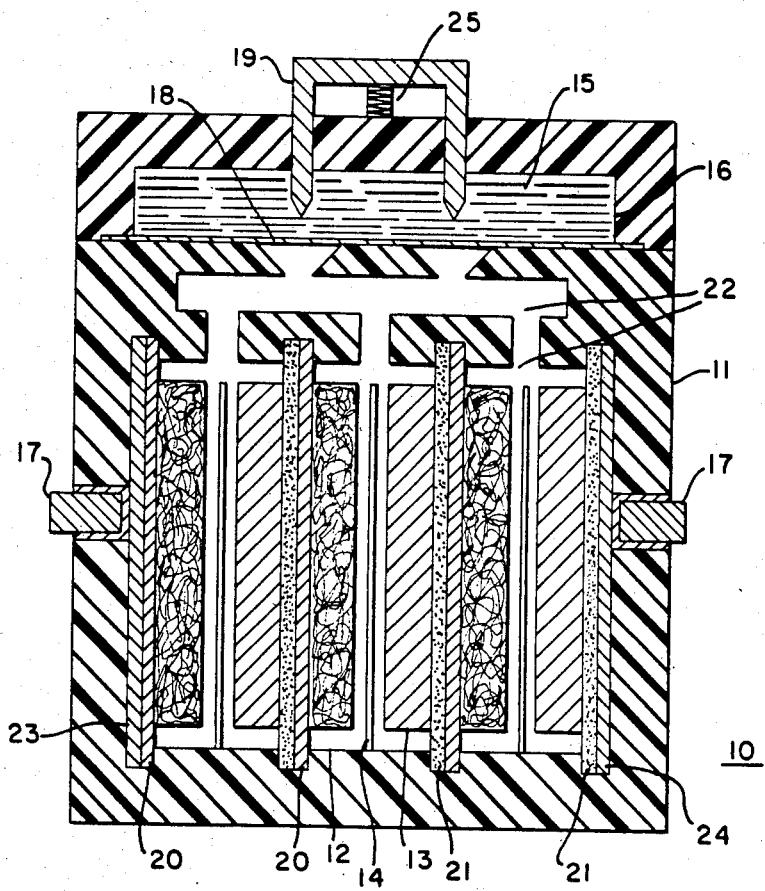

NICKEL-ALUMINUM DRY CHARGE RESERVE BATTERY

BACKGROUND OF THE INVENTION

Deferred action batteries are those in which the electrolyte required for activation is stored away from the electrodes, and is brought into contact with the electrodes at the moment of use of the battery. This provides a battery with outstanding shelf life. Jeannin, in 1958, in U.S. Pat. No. 2,847,494, taught batteries of this type, having nickel sesquioxide positive electrodes and zinc negative electrodes for potassium hydroxide electrolyte; cuprous chloride positive electrodes and magnesium negative electrodes for sodium chloride electrolyte; or carbon positive electrodes and zinc negative electrodes for chromic acid electrolyte.

Solomon et al., in U.S. Pat. No. Re. 25,913, taught use of compressed gas to rupture an electrolyte containing bladder against a stationary point, for introduction of electrolyte into the battery at the moment of use. Here, bipolar electrodes, i.e. anodes and cathodes bonded to a common support were used. Positive electrodes taught were silver oxide, silver peroxide, copper oxide, nickel oxide and lead peroxide. Negative electrodes taught were zinc, cadmium, lead, or magnesium. Zarom, in U.S. Pat. No. 3,332,804, taught removal of plastic or inactive metal foil separators to introduce electrolyte into a reserve battery containing bipolar electrodes. Anode electrodes taught were zinc, aluminum, magnesium, and alloys of aluminum with zinc, magnesium or mercury. Cathode electrodes taught were silver oxide. Electrolyte was either aqueous sodium hydroxide or potassium hydroxide.

Schiffer et al., in U.S. Pat. No. 4,005,246, taught reserve batteries containing dry, dissolvable electrolyte into which water was added to activate the battery. Anode electrodes taught were zinc, cadmium, magnesium, aluminum and aluminum alloy. Cathode electrodes taught were silver oxide, silver chloride or manganese dioxide. The dry electrolyte was selected from sodium chloride, potassium chloride or ammonium chloride.

While all of these batteries have their own particular advantages, new reserve battery systems having low cost, high energy densities, and other improved characteristics would be useful and desirable.

SUMMARY OF THE INVENTION

A nickel-aluminum dry charge reserve battery has been found to provide a unique electrochemical couple having a high energy density, when used with a suitable electrolyte, such as aqueous sodium hydroxide or potassium hydroxide. These batteries can be constructed in a bipolar plate high power configuration or in a traditional parallel plate configuration. Energy densities are in the range of 257 Wh/pound of reactants. Electrolyte would be held, in one preferred embodiment, in an overhead reservoir near the case containing the electrodes, with a penetrator positioned to break a bottom seal membrane allowing gravity flow of electrolyte into contact with the electrodes.

Preferably, the nickel electrode will be a nickel hydroxide type of active material doped with minor amounts of cobalt, such as cobalt hydroxide, as a charging additive. The nickel hydroxide containing active material may also be a mixture of hydrated nickel (II) hydroxide and nickel (IV) hydrated oxide interlayer doped with alkali metal cations, characterized as a nickel (III) hydroxide. Throughout this specification, the term "nickel hydroxide containing" active battery material will be used to mean a battery material containing nickel hydroxide and will include these nickel hydroxide containing materials plus other similar type active battery materials containing nickel hydroxide compounds, i.e., containing the —OH group, in substantial amounts. These nickel hydroxide containing active battery materials will preferably be disposed in a flexible, porous, non-corrosive fiber metal plaque or grid. The nickel electrode will be electrolyte permeable and will generally be attached to a nickel or nickel plated steel current collector.

The aluminum electrode will preferably be in sheet form, and contain minor amounts, up to about 5 wt.%, of gallium, indium, tin, or other similar additive effective to control corrosion in the electrolyte to be used. Throughout this specification, the term "aluminum" will be used to include such "alloys" containing minor amounts of additive. Preferably, the aluminum electrode, when used in a bipolar construction will be electrically connected to the current collector by an electrically conducting bond such as a low melting fusible metal alloy, an electrolyte resistant conductive resinous adhesive, or the like.

BRIEF DESCRIPTION OF THE DRAWING

For a better understanding of the invention, reference may be made to an embodiment exemplary of the invention, shown in the accompanying drawing, which shows one embodiment of the dry charge reserve battery of this invention in bipolar plate construction, with an associated, adjacent top electrolyte reservoir and means to transfer stored electrolyte through flow channels to the electrodes.

DESCRIPTION OF THE PREFERRED EMBODIMENTS

Referring to the Drawing, a nickel-aluminum dry charge reserve battery 10 is shown, comprising a case 11, within which are disposed: at least one positive electrode 12 comprising nickel hydroxide containing active battery material, at least one negative electrode 13 comprising aluminum, and at least one separator 14 between adjacent positive and negative electrode faces. Electrolyte 15 is contained in a reservoir container 16. Electrical connections to the battery 17; thin, electrolyte sealing, nonporous membrane 18; and membrane penetration means 19 are also shown, as are positive electrode current collector cell separator sheets 20, electrically conducting bonding medium 21 and electrolyte flow channels 22. In the Drawing, the electrodes are shown in a bipolar plate configuration.

The anode, positive electrode 12 will have nickel hydroxide containing active battery material pasted onto or into a suitable support structure. This pasted positive electrode will be permeable to electrolyte. The positive electrode active battery material can contain one or both of nickel (II) hydroxide, i.e., $Ni(OH)_2$, and nickel (III) hydroxide, i.e., $NiOOH$ or a mixture of nickel (II) hydroxide and nickel (IV) material; with from about 1 wt.% to about 12 wt.% of cobalt, usually contained in cobalt hydroxide, i.e., $Co(OH)_2$, as a charging additive. In charged form, the nickel hydroxide will be primarily in the oxidized nickel (III) hydroxide form and the cobalt hydroxide will be in the cobalt (III) hydroxide form. This nickel hydroxide containing active battery material is preferred, and its production, as well as its formation in metallic plaques is detailed in U.S. Pat. No. 4,337,124, herein incorporated by reference.

Another preferred nickel hydroxide containing active battery material contains from about 60 wt.% to about 95 wt.% of hydrated nickel (II) hydroxide and about 5 wt.% to about 40 wt.% of nickel (IV) hydrated oxide which is interlayer doped with from about 0.2 atom % to about 2 atom % of alkali metal cation selected from potassium cation, sodium cation and lithium cation. This mixture, containing nickel hydroxide is characterized as nickel (III) hydroxide. This material is made by contacting a slurry of hydrated nickel (II) hydroxide, which contains alkali metal cation, with an ozone-air or ozone-oxygen gas mixture at an over atmospheric pressure, as taught in U.S. Pat. No. 4,330,603, herein incorporated by reference.

As mentioned before, any active battery compound containing a substantial amount of nickel hydroxide can be used as the anode, positive electrode 12, and the term "nickel hydroxide containing" active battery material will be used herein to describe battery materials containing these compounds.

This nickel hydroxide containing active battery material can be directly precipitated into porous plaques, or in some instances, made in powder form. When in powder form, it usually has water added, to form a paste, which paste is pressed onto or into the plaque or a suitable grid. The preferred plaque in either case is from abut 75% to 95% porous, as described in U.S. Pat. No. 4,337,124, and is made of fibers about 0.0002 inch to about 0.003 inch in diameter bonded together at fiber contact points. The fibers are preferably nickel fibers, or nickel plated, bonded steel wood fibers. These plaques are shown as 12 in the Drawing.

In many instances, the pasted, loaded plaques must be electrochemically "formed" by a charge discharge reaction to activate them, and form the oxidized Ni (III) hydroxide state, after which they are washed and dried and are ready for use. These plaques will usually have a thin nickel or nickel plated steel current collector sheet 20 hot press sinter bonded to them. The nickel containing active material loaded plaque will generally be about 1/32 inch to about ⅛ inch (0.03 inch to 0.125 inch) thick, and the current collector sheet will generally be about 0.010 inch thick.

The cathode, negative electrode 13 will preferably be sheet form aluminum, preferably containing a minor effective amount, generally from about 0.5 wt.% to about 5 wt.% of a metal which will control corrosion of the aluminum sheet in the electrolyte, such as gallium, indium, tin, and the like. As mentioned before, the term "aluminum" will be used herein to include such "alloys" containing minor amounts of corrosion inhibitors. The aluminum electrode will generally be about 1/32 inch to about ⅛ inch (0.03 inch to 0.125 inch) thick. These sheets can be formed by casting and rolling or by a powder metallurgy process.

When a bipolar plate electrode combination is to be used in the battery of this invention, as shown in the Drawing, where electrons travel uninhibited from electrode to electrode until a terminal 17 is reached, rather than being collected via lead tabs from each electrode as in a parallel plate configuration; an electrically conducting bonding medium 21 is used to electrically connect the negative electrode 12 and the current collector cell separator 20 of the positive electrode. This bonding medium can be a low temperature fusible, conducting solder material, preferably containing major amounts of bismuth, for example, a 93° C. melting point material containing about 50 wt.% Bi, 25 wt.% Sn, and 25 wt.% Pb, or woods metal, which is a 68° C. melting point material containing about 50 wt.% Bi, 25 wt.% Pb, 12.5 wt.% Sn, and 12.5 wt.% Cd. Another useful bonding medium is a conducting resinous adhesive, such as a suitable alkali hydroxide resistant graphite particle or fiber filled epoxy resin. The bonding medium thickness when used will be about 0.010 inch.

In the electrochemical system using a dry charged nickel hydroxide containing electrode and an aluminum counter electrode, in an alkali hydroxide electrolyte, the reactions are:

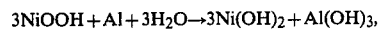

or

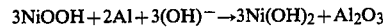

The voltage for this nickel-aluminum system, assuming a one valence charge for the nickel electrode is about 2.14 V. The energy density based on reaction (I) is about 257 Wh/pound of reactants.

Suitable separators 14 between adjacent positive and negative electrode faces are 0.005 inch to 0.020 inch thick, ion permeable, micro porous, sheet material, resistant to the electrolyte, for example, single or plural plies of polypropylene or polyethylene sheet. The usual electrolyte space between positive and negative electrodes is from abut 0.015 inch to about 0.05 inch.

The electrolyte used will generally be 25 wt.% to 40 wt.% aqueous sodium hydroxide or potassium hydroxide. Also shown in the Drawing are anode and cathode end plates, 23 and 24 respectively, which are generally 0.010 inch thick nickel or nickel coated steel. After a load is applied to the battery and the electrolyte is introduced to contact the electrodes, electrons from the cathode end plate 24 will proceed through successive conducting bipolar plates and electrolyte until they complete the interior circuit and are collected at the anode end plate 23. In the Drawing, the case 11, shown containing the electrodes and separators can be made of polyethylene, polypropylene, ABS plastic (acrylonitrile-butadiene-styrene copolymer), or other suitable durable material resistant to electrolyte.

One embodiment of an electrolyte reservoir container 16 is shown in the Drawing where the reservoir is adjacent to the case containing the electrodes. A thin, non-porous membrane sheet material 18, such as nickel foil or ABS plastic, about 0.005 inch to about 0.010 inch thick, seals electrolyte 15 in the top of the battery case. When the battery is to be actuated, a suitable, associated membrane penetration means 19, such as a single or plural sharp metal or plastic punch apparatus, manually, mechanically or electrically activated, is pushed through the membrane 18 and released, as by spring 25 so that electrolyte can gravity-flow downward. The electrolyte will then flow through the penetrated area into and through the various electrolyte flow channels 22 leading to the electrodes, and into the pores of the nickel electrode and the space between the positive and negative electrodes, at which time, the battery will be instantly ready for use.

In combination, the membrane, the penetration means, and the flow channels constitute a means to transfer stored electrolyte to the electrodes. Of course, any other type of suitable electrolyte injection means from any type of reservoir disposed near the battery case can be used in this invention. Various pressure systems can also be used for applications where the battery may not be standing upright. Thus, electrolyte remains separated from the electrodes until battery use, providing a very long shelf life for the dry battery plates.

EXAMPLE

A 1.25 in.×6.5 in.×0.030 in. plaque of diffusion bonded, 90% porous, nickel plated steel fibers was pasted by a wet slurry procedure with nickel (II) hydroxide containing about 5 wt.% cobalt as cobalt (II) hydroxide. These loaded plaques were then electrochemically charged in 31 wt.% aqueous potassium hydroxide and discharged with nickel counter electrodes in a half cell construction, to activate the active material. The plaque was then charged to oxidatively "form" the active material, removed from the cell, rinsed in deionized water, dried in an air oven at 50° C. for 2 hours, and cooled, to provide an electrode pasted with nickel containing active battery material in the form of cobalt doped dry charged nickel (III) hydroxide. The loaded plaque was still porous and permeable to electrolyte.

This electrode plaque, loaded with nickel hydroxide containing active material, was placed opposite a 1.25 in.×6.5 in.×0.010 in. unalloyed aluminum electrode sheet in a ½ inch wide container, with a porous, 0.030 in. polyethylene separator between the electrodes. Both electrodes were attached to an external variable resistor so as to initially draw a 0.75 amp current from the cell when it was actuated. Then, 25 wt.% aqueous KOH electrolyte was poured between and around the electrodes to substantially immerse the electrodes and separator. Almost instantly, voltage readings registered. At 1 amp the voltage read 1.8 volts, and at 5 amps the voltage read 1.33 volts. The nickel-aluminum battery operated well and provided an excellent, inexpensive electrochemical couple.

We claim:

1. A nickel-aluminum reserve battery comprising:
   (1) a case within which are disposed at least one bipolar plate comprising:
      (i) an electrode comprising battery material, the battery material consisting essentially of nickel hydroxide, said material containing —OH groups, and
      (ii) an electrode comprising aluminum,
   (2) a storage reservoir containing aqueous alkali hydroxide electrolyte near the case, and
   (3) means to transfer stored electrolyte to the electrodes where the nickel hydroxide containing electrode is connected to a current collector, which current collector is in turn connected to the aluminum electrode of the bipolar plate by means of an electrically conducting bonding medium.

2. The nickel-aluminum battery of claim 1, where the nickel hydroxide battery material is a nickel (III) hydroxide material, the battery contains a plurality of bipolar plates, and at least one porous separator is disposed between adjacent bipolar plates.

3. The nickel-aluminum battery of claim 1, also containing electrical connections and where the storage reservoir is adjacent to the case, allowing transfer of electrolyte.

4. The nickel-aluminum battery of claim 3, where the storage reservoir is connected to flow channels leading to the electrodes, the electrolyte is sealed from the flow channels by a thin, non-porous sheet material associated with a punch apparatus capable of penetrating the sheet material and allowing electrolyte flow to the electrodes.

5. The nickel-aluminum battery of claim 1, where the nickel hydroxide containing electrode of the bipolar plate has a fiber metal structure and is connected to a current collector selected from the group consisting of sheet nickel and nickel plated sheet steel.

6. The nickel-aluminum battery of claim 1, where the nickel hydroxide containing battery material consists essentially of a cobalt doped nickel (III) hydroxide material, said battery material is disposed within a fiber metal plaque selected from the group consisting of nickel fibers and nickel plated steel wool fibers, and the aluminum electrode consists essentially of sheet aluminum containing minor amounts of a material selected from the group consisting of gallium, indium, and tin.

7. A bipolar battery plate comprising:
   (1) an electrode comprising battery material, the battery material consisting essentially of nickel hydroxide, said material containing —OH groups, and
   (2) an electrode comprising aluminum, where the nickel hydroxide containing electrode contains battery material disposed within a fiber metal plaque selected from the group consisting of nickel fibers and nickel plated steel wool fibers, where said metal plaque is connected to a current collector selected from the group consisting of sheet nickel and nickel plated sheet, where said current collector is connected to the aluminum electrode by means of an electrically conducting bonding medium.

8. The bipolar battery plate of claim 7, where the nickel hydroxide battery material is a cobalt doped nickel (III) hydroxide material.

* * * * *